United States Patent
Fishbain (10) Patent No.: US 7,113,924 B2
(45) Date of Patent: Sep. 26, 2006

(54) SYSTEM AND METHOD FOR ELECTRONIC SPREAD TRADING IN REAL AND SYNTHETICALLY GENERATED MARKETS

(75) Inventor: Michael L. Fishbain, Wilmette, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 10/727,466

(22) Filed: Dec. 4, 2003

(65) Prior Publication Data
US 2005/0125327 A1    Jun. 9, 2005

(51) Int. Cl.
*G06Q 40/00* (2006.01)
(52) U.S. Cl. ................................. 705/37; 705/35
(58) Field of Classification Search ............. 705/35, 705/37
See application file for complete search history.

(56) References Cited

U.S. PATENT DOCUMENTS

2001/0042040 A1 * 11/2001 Keith .................... 705/37
2003/0033240 A1 * 2/2003 Balson et al. ........... 705/37
2004/0193526 A1 * 9/2004 Singer et al. ........... 705/37
2005/0027635 A1 * 2/2005 Monroe et al. ......... 705/37

OTHER PUBLICATIONS

Business Wire; "Trading Technologies Combines Automated Spread Trading with Multi-Exchange Access and Ultrafast Front-End-X_Trader Pro Introduces TT Autospreader, Enabling Traders to Work Cross-Exchange Spreads Automatically"; Apr. 11, 2002; 1 page.*
International Search Report for PCT/US04/40790.

* cited by examiner

Primary Examiner—Alain L. Bashore
(74) Attorney, Agent, or Firm—McDonnell Boehnen Hulbert & Berghoff LLP (57) ABSTRACT

A system and method are provided to analyze synthetic and real markets that offer interchangeable tradeable objects to find market opportunities that a trader may capitalize on. A synthetic market is an electronic market created out of real markets by a computer terminal or gateway. A real market is an electronic market that is offered by an electronic exchange. If a desirable market opportunity is found, the preferred embodiments can take action such as by sending orders to either one of the markets, or by sending orders to both markets. An advantage of the preferred embodiments, among many others, is that they can make "invisible" trading opportunities more readily apparent.

19 Claims, 6 Drawing Sheets

SYSTEM AND METHOD FOR ELECTRONIC SPREAD TRADING IN REAL AND SYNTHETICALLY GENERATED MARKETS

FIELD OF INVENTION

The present embodiments relate to a computer-based method and system for use in electronic trading, and in particular, for use in trading any product with a quantity and/or price.

BACKGROUND

At one time, there were only open-outcry exchanges where traders, or more specifically buyers and sellers, would come together to trade in person. With the advent of electronic trading, traders may participate at their computer terminals from remote distances by communicating over physical networks with electronic exchanges that automatically match bids and offers.

Figure 1:
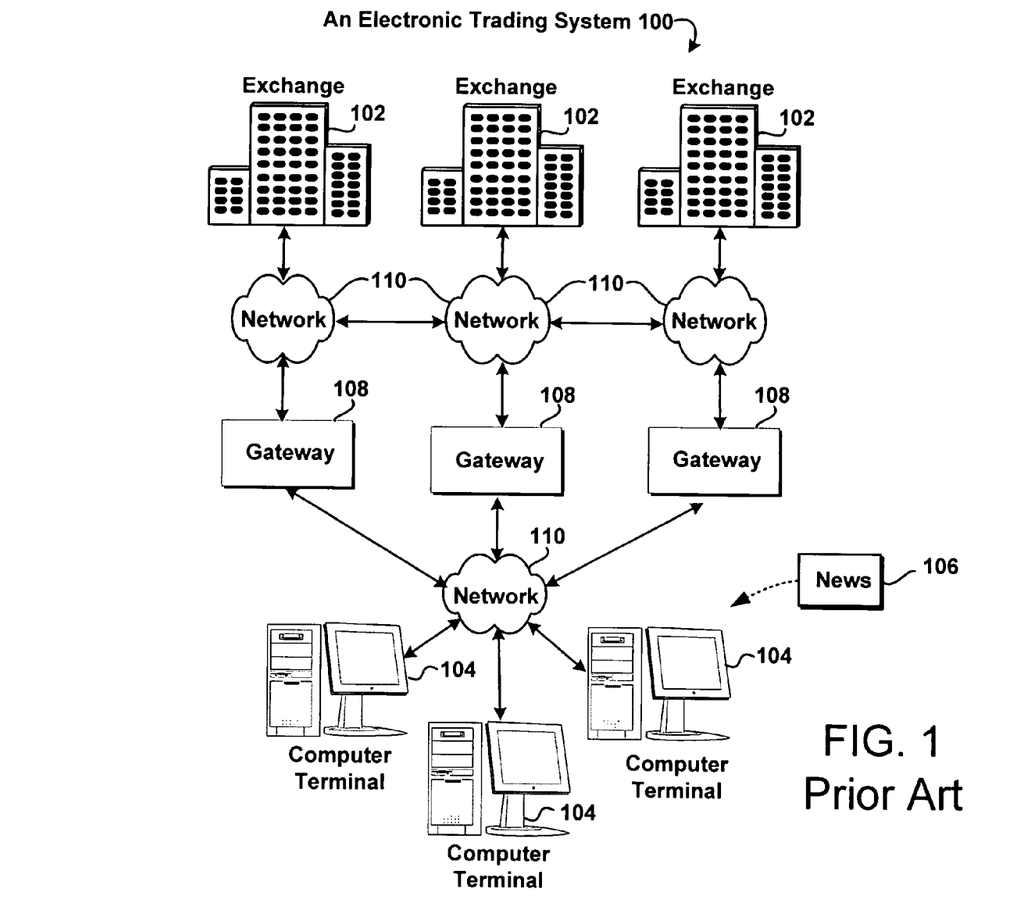
FIG. 1 illustrates example network connections between multiple electronic exchanges and client sites according to a typical trading system configuration.

FIG. 1 is provided to illustrate an example of an electronic trading system. As shown, electronic trading system 100 includes one or more electronic exchanges generally indicated as 102 in communication with one or more computer terminals generally indicated as 104 via any type of network-based protocols. Intermediate devices such as gateways generally indicated as 108, routers (not shown), and other such types of network devices may be used to connect various computer networks 110 so that computer terminals 104 and electronic exchanges 102 can communicate. Of course, other types of configurations known in the art may be used to connect buyers and sellers in place of, or in addition to, electronic trading system 100.

Electronic exchanges 102 represent any type of electronic forum that facilitates electronic trading. Electronic exchanges 102 are generally based on computers that perform, among other things, order matching, maintain order books, positions, and price information. Some examples of electronic exchanges 102 include the London International Financial Futures and Options Exchange (LIFFE), the Chicago Board of Trade (CBOT), the New York Stock Exchange (NYSE), the Chicago Mercantile Exchange (CME), the Exchange Electronic Trading ("Xetra," a German stock exchange), and the European Exchange ("Eurex"). Electronic exchanges 102 might also refer to other software and/or hardware based facilities, which include basic to complex systems that automatically match incoming orders.

Each of electronic exchanges 102 may host one or more electronic markets such that each electronic market provides a place to trade a tradeable object. As used herein, the term "tradable objects," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable objects, such as a class of tradable objects.

Any type of computer-based order matching algorithm may be used to match orders in a given electronic market; sometimes the type of algorithm depends on the tradeable object being traded. For sake of illustration, some example order execution algorithms include price/time priority (sometimes also referred to as first-in-first-out or FIFO) and pro rata-style algorithms. The FIFO algorithm, used for some markets listed with Eurex for example, attempts to give priority to the first person to place an order. The pro rata algorithm, used for some markets listed with LIFFE for example, splits all (or most) orders for the same price at a particular point in time.

Regardless of the type of matching algorithm used, each of the electronic markets may provide similar types of market information to subscribing computer terminals 104. At the very least, market information includes data that represents just the inside market. The inside market is the lowest sell price (best ask) and the highest buy price (best bid) available in the market. Market information may also include market depth. Market depth refers to quantities available at the inside market and can refer to quantities available at other prices away from the inside market. The quantity available at a given price level is usually provided by the electronic exchanges 102 in aggregate sums. The extent of the market depth available to a trader usually depends on the electronic exchanges 102. For instance, some exchanges provide market depth for all (or most) price levels, while some provide only quantities associated with the inside market, and others may provide no market depth at all. Additionally, electronic exchanges 102 can offer other types of market information such as the last traded price (LTP), the last traded quantity (LTQ), and order fill information.

Gateways 108 are intermediate computer devices that receive market information from electronic exchanges 102 and convert it to a form compatible with the protocols used by computer terminals 104, and vice-versa, using conversion techniques known in the art. Also, as known by those of ordinary skill in the art, gateways 108 may have one or more server programs to support the data feeds passing between computer terminals 104 and electronic exchanges 102, such as a price server for providing the market information, an order server for processing transaction information, and a fill server for processing fill information. Transaction information includes inputs from computer terminals 104 to electronic exchanges 102 and may include, among other things, orders, order changes, and queries.

Computer terminals 104 are computers that provide an interface for traders to trade at one or more electronic markets listed with one, some, or all of electronic exchanges 102. Some examples of computer terminals include a personal computer, laptop computer, hand-held computer, or any computing device with a processor and mechanism for electronic storage. Computer terminals 104 logged on to trade can receive market information. The market information may be displayed to the trader(s) on a visual output device or display device. In addition, a trader may receive news 106 to aid in analyzing information received from the exchange. Upon viewing the market information or a portion thereof, a trader may wish to send orders to an electronic market, cancel orders in an electronic market, change orders in a electronic market, query an electronic exchange, and so on. Traders might use automated software tools to assist them in their trading.

Using computer terminals 104, traders can implement various trading strategies including those previously used on the floor of an exchange. Such strategies incorporated into an electronic marketplace can improve the speed, accuracy, and ultimately the profitability of trading electronically. One such trading strategy is spread trading.

In general, spread trading is the buying and/or selling of two or more tradeable objects, the purpose of which is to capitalize on changes or movements in the relationships between the tradeable objects. The tradeable objects that are used to complete a spread are referred to as the outright markets or legs of the spread. A spread trade could involve buying tradeable objects, buying and selling tradeable objects, selling tradeable objects or some combination thereof.

However, spread trading may involve risk. For example, to achieve a spread differential, a trader typically works orders in two or more different markets. An order in one of those markets may fill, but the market conditions could change in another market, leaving the offsetting order unfilled and the spread incomplete. This results in the trading being "legged up," because only one side of the spread transaction is complete. As a result, the trader might lose lots of money to complete the transaction at an undesirable price, or remain unhedged totally.

To avoid some of these risks, traders may trade in exchange provided spread markets. Electronic exchanges have introduced spread markets that guarantee the trader will not be "legged up" by taking certain precautions, for example. Accordingly, those exchange-provided-spreads might behave differently than if they did not provide this "no-legged" up guarantee. The different behavior expressed by these types of exchange-provided-spreads might result in less aggressive and less riskier trading than through conventional spread trading where the trader works orders in multiple markets to achieve a spread differential upon execution. However, this might also result in less profit than spread trading in the more conventional way.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments.

DETAILED DESCRIPTION

I. Overview

The present invention includes methods, systems, and computer program products that provide tools for use in electronic trading. The preferred embodiments may be put to advantageous use in any type of electronic trading environment. By using the preferred embodiments, for example, a trader's efficiency may be increased and the time it takes to uncover "invisible" trading opportunities and take advantage of those opportunities may be reduced.

In a preferred embodiment, real markets and synthetic markets, which both offer interchangeable products, are analyzed to find market opportunities that the trader may capitalize on. As used herein, a synthetic market is an electronic market created out of real markets by a computer terminal or gateway, for instance, rather than at an electronic exchange. Whereas, a real market is an electronic market that is offered by an electronic exchange. An advantage of the preferred embodiments is that the trader may now take advantage more easily of unique market opportunities that might exist in the real and synthetic markets, rather than just looking to one market or another independently.

As such, if a desirable trading opportunity arises from the evaluation in any one of the electronic markets (e.g., real markets and synthetic markets), then orders may be directed from the one market to another, orders may be sent to multiple markets simultaneously, arbitrage opportunities such as profiting by price differences on different markets might be spotted and executed, or key market information from the various interchangeable markets may be displayed on one interface.

An "autospreader" is used in this application to illustrate aspects of the preferred embodiment. The autospreader is a trading software tool that generates a synthetic market at a trader's workstation or gateway from real markets. The autospreader is described in U.S. patent application Ser. No. 10/137,979, entitled, "A System and Method for Performing Automatic Spread Trading" the contents of which is incorporated by reference herein. It should be understood, however, that the present invention is not limited for use with the autospreader, which will become more apparent to one of ordinary skill in the art from the following description.

Other systems, methods, features, and advantages of the present embodiments will be or become apparent to one with skill in the art upon examination of the following drawings and description. It is intended that all such additional systems, methods, features, and advantages be within the scope of the present invention, and be protected by the accompanying claims.

II. System Architecture

As will be appreciated by one of ordinary skill in the art, the preferred embodiments may be operated in an entirely software embodiment, in an entirely hardware embodiment, or in a combination thereof. For example, in a software embodiment, the preferred embodiments may take the form of a computer program product that is stored on a computer readable storage medium and is executed by a suitable instruction execution system. Any suitable computer readable storage medium may be utilized including hard disks, CD-ROMs, optical storage devices, or magnetic storage devices, for example. In a hardware embodiment, the preferred embodiments may be implemented using any technology or hardware components such as application specific integrated circuits (ASICs).

Figure 2:
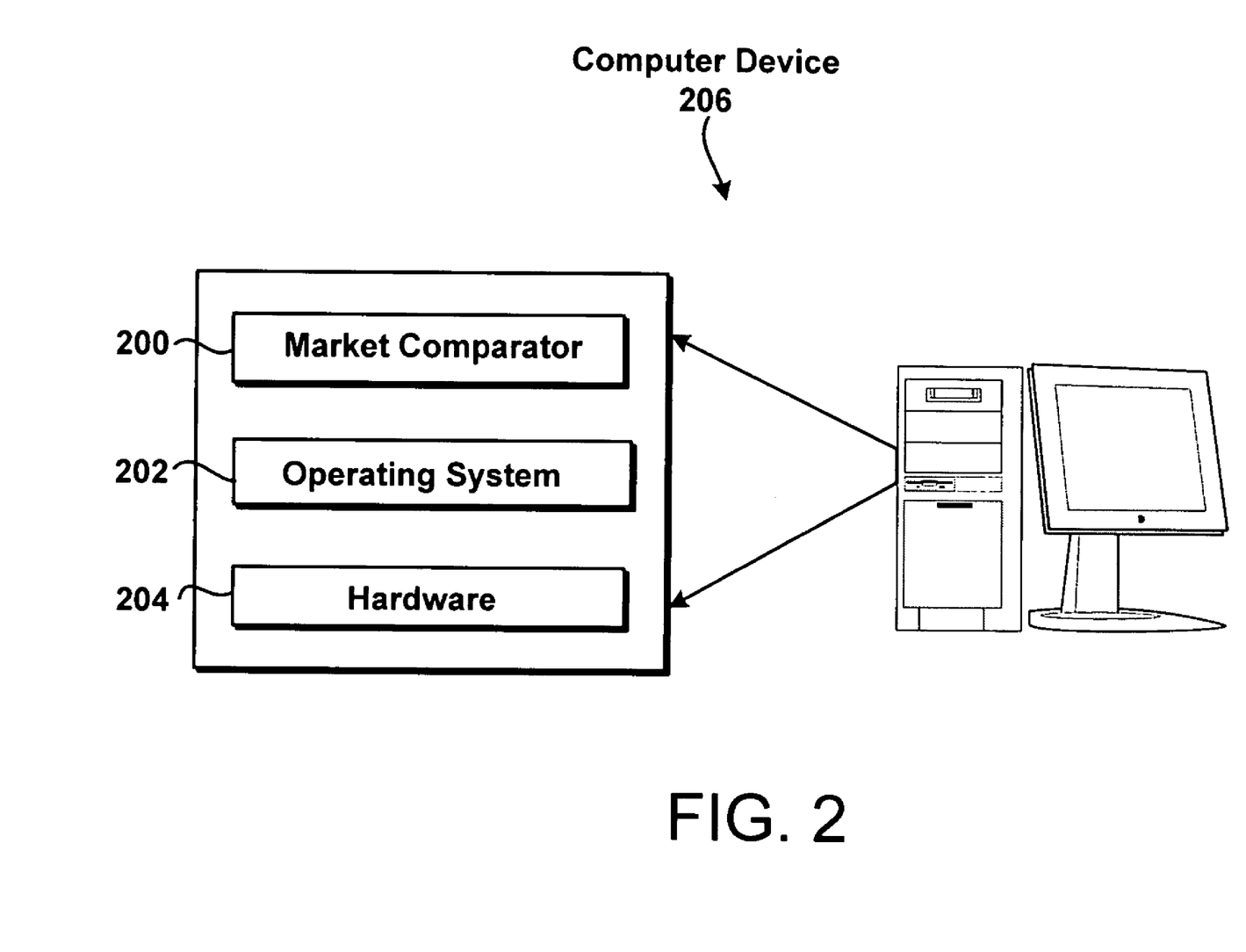
FIG. 2 illustrates an example schematic of a market comparator along with an operating system and hardware components of a computer device.

With reference to FIG. 2, illustrated is a market comparator 200 along with an operating system 202 and hardware components 204 of a computer device 206. Computer device 206 may be comparable to one of the computer terminals 104 shown in FIG. 1 such that either one of devices 104, 206 may operate as a trader's workstation, though it will be recognized by those skilled in the art that other computer-based devices (e.g., gateways) may be used to implement the present embodiments. Alternatively, components of the preferred embodiments may reside at a cluster of computer-based devices that work together to perform the functions described herein.

Market comparator 200, operating system 202, and hardware 204 may communicate by an internal bus or an equivalent mechanism for communication. By way of illustration, computer device 206 may be located at a trader's desk and it may allow the trader to participate in trading at one or more electronic markets via one or more of a variety of computer networks. Thus, computer device 206 is able to communicate either directly or indirectly with one or more electronic exchanges to receive market information and transmit transaction information.

Market comparator 200 preferably comprises a software program to assist in performing the functions described herein. As such, it is preferably implemented by a C+ or C++ based software program, though other suitable program languages can be utilized such as Java. Market comparator 200 may be used with other software applications such as an autospreader software tool (not shown in the figure). Autospreader may be part of a trading application which allows a trader to view market information, enter and cancel trade orders and/or view orders through a graphical user interface, for example. A commercially available trading application is X_TRADER® from Trading Technologies International, Inc. of Chicago, Ill. X_TRADER® also provides an electronic trading interface, referred to as MD_TRADER™, in which working orders and/or bid and ask quantities are displayed in association with a common price axis. X_Trader and MD_Trader are described in U.S. patent application Ser. No. 09/590,692, entitled "Click Based Trading with Intuitive Grid Display of Market Depth" filed Jun. 9, 2000, the contents of which are incorporated herein by reference. The preferred embodiments, however, are not limited to any particular product used.

Operating system 202 may include the software that controls the allocation and usage of hardware resources 204 such as memory, central processing unit (CPU) time, disk space, and peripheral devices (e.g., keyboard, mouse, display screen, external connections, etc.) connected. Preferably, operating system 202 operates as the foundation software on which the market comparator 200 and autospreader may operate. Example operating systems include Windows 98, Windows 2000, Windows NT, Mac OS, Linux, and UNIX.

III. System Features

The following are features of the preferred embodiment that provide particular functionalities and utilities to electronic trading. The functionalities include the ability to trade in multiple electronic markets through one screen, evaluating market conditions in a variety of different electronic markets, directing orders to various markets, spotting arbitrage opportunities, displaying price differences, just to name a few. As previously mentioned, to illustrate these features, the market comparator is used in combination with an autospreader, which is used to generate a synthetic market from which a trader may trade. Then, the market comparator can analyze the synthetic market with other interchangeable markets to provide a trader with these additional benefits and functionalities. Again, however, it should be noted that the present embodiments can work with any tradeable objects and they are not to be limited for use with the autospreader and/or trading spreads.

Figure 3:
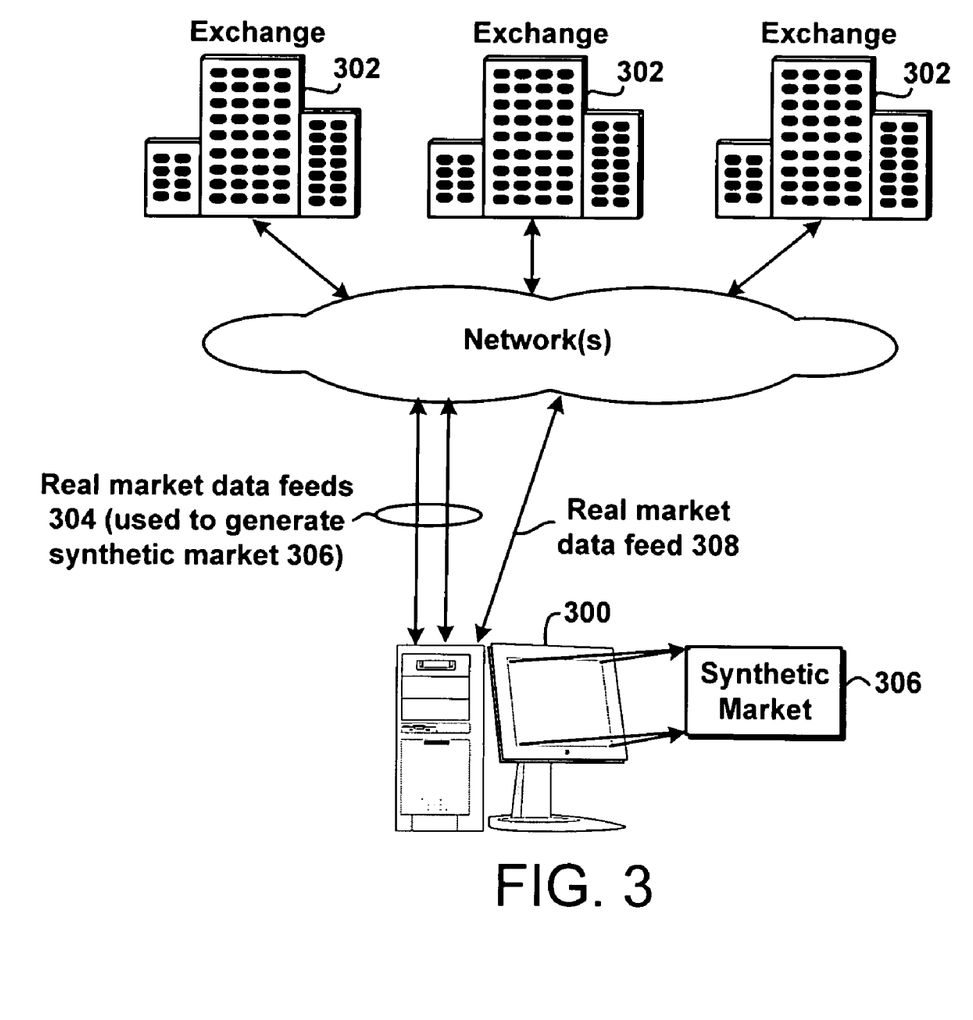
FIG. 3 is a diagram showing the communication of real market data to computer terminals for use in evaluation by the system of FIG. 2.

With reference to FIG. 3, when beginning a session with the autospreader, a trader from his terminal 300 may first select real markets to operate as "legs" of the synthetic market spread. To do this, the trader may look to any electronic exchange, generally shown as 302, and select two or more tradeable objects. Once the legs are selected, the autospreader may receive data feeds 304, which correspond to the legs, to generate a synthetic market spread 306. By way of illustration, if the autospreader were implemented on the trader's terminal 300, then only the trader would see the synthetic market spread 306. If the autospreader is implemented at a gateway (this example is not shown in the figure), then only those traders connected to the gateway could see the synthetic spread market. Preferably, the autospreader allows the trader or traders to enter orders into the synthetic market spread 306, and the autospreader automatically works orders in the real markets of the spread to achieve or attempt to achieve the spread differential at execution. Note that the order entered into the synthetic market spread 306 is associated with a spread and preferably refers to a desire to buy or sell the spread at a particular spread price. The actual price obtained may differ from the desired spread price, especially if "slop" is used. In general, slop provides a tolerance of acceptable prices for which the trader is willing to buy or sell a tradeable object. Slop is further described in U.S. patent application Ser. No. 10/137, 979, the contents of which have already been incorporated herein by reference.

During this time, electronic exchanges 302 offer other tradeable objects to trade. Among those tradeable objects are exchange provided spreads. Electronic exchanges generate all sorts of spreads (also referred to herein as real market spreads) some of which are related to other real markets offered by the exchange and some of which are not related to other real markets. By trading in any one of these types of real market spreads, the trader is guaranteed that he will not be "legged up." Furthermore, let us assume that some real market spreads offer tradeable objects that are interchangeable with tradeable objects being offered by the synthetic market spread 306, and therefore, may be traded interchangeably. The preferred system has access to these interchangeable tradeable objects, and particular to this example, it has access to real market spread 308, which for the purposes of this application is interchangeable with the synthetic market spread 306.

At this point, it is worth noting that while the real market spread and the synthetic market spread represent interchangeable tradeable objects, they are not from the same electronic market. (As used herein, the term interchangeable tradeable objects may also include tradeable objects that are semi-interchangeable). Accordingly, they do not necessarily share the same market information, as they may not be derived in the same manner. In fact, in this example, we know that the synthetic market spread was derived from the autospreader and that the real market spread is offered by an electronic exchange.

Figure 4:
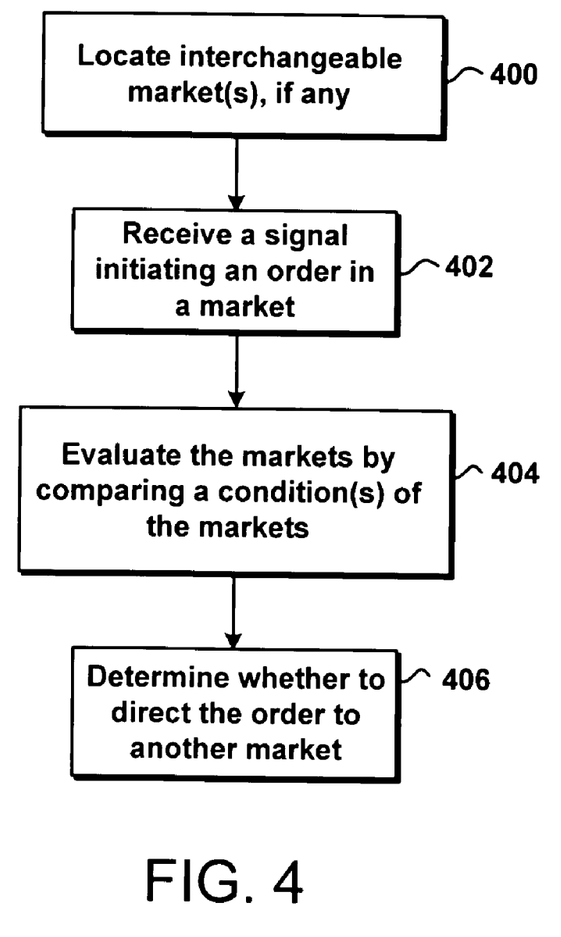
FIG. 4 is a flowchart illustrating a process for trading using the system of FIG. 2.

Turning now to FIG. 4, a flowchart is shown for illustrating the functionality and operation of the system shown in FIG. 2. In addition, the flowchart is described below with reference to the synthetic market spread 306 and the real market spread 308 from FIG. 3. With reference to FIG. 4, each block may represent a module, segment, or portion of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those of ordinary skill in the art of the present invention.

At step 400, market comparator 200 locates one or more interchangeable markets so that it may efficiently evaluate each real and/or synthetic market. For example, market comparator 200 may exhaustively search electronic exchanges 302 to find interchangeable real market spreads such as real market spread 308. It might do this by matching names of tradeable objects; for example, a "Sep./Dec." synthetic market spread may be interchangeable with a "Sep./Dec." real market spread. Guidelines might be input by a trader to assist the preferred embodiments in locating the correct markets. Alternatively, the trader may provide market comparator 200 with one or more interchangeable market spreads including real market spread 308. The trader might do this by manually selecting electronic markets from a graphical user interface, for example.

At step 402, a signal is received by market comparator 200 indicating a desire to buy or sell in the synthetic market spread. In other words, an order has been initiated. When an order is initiated, it preferably means that according to the trader he/she has just "sent" the order to the exchange, although according to the computer software the order message has not yet left the computer system. At this point in the process, there is a desire to buy or sell a certain tradeable object at a desired price and market comparator 200 intercepts this order information. Alternatively, a signal is received by market comparator 200 indicating a desire to buy or sell in the real market spread (e.g., the trader might wish to send an order to the real market spread, instead of, or in addition to, sending an order to the synthetic market spread).

Note again that an order indicating a desire to buy or sell in the synthetic market spread preferably refers to a desire to buy or to sell the spread at the desired spread price such that computer software such as the autospreader attempts to achieve a price based on the desired spread price by automatically sending and managing one or more orders in the one or more underlying legs. As step 402, however, the computer software has not yet sent an order into a leg (e.g., a real market at the electronic exchange) of the synthetic market.

At step 404, market comparator 200 preferably analyzes one or more market conditions in the real market spread and the synthetic market spread. Conditions might include the inside market, only the best bid price or quantity, only the best ask price or quantity, the last traded price, the last traded quantity, more/less quantities in the real market spread versus the synthetic market spread, or some other condition or parameter preferably set by the trader.

Figure 5:
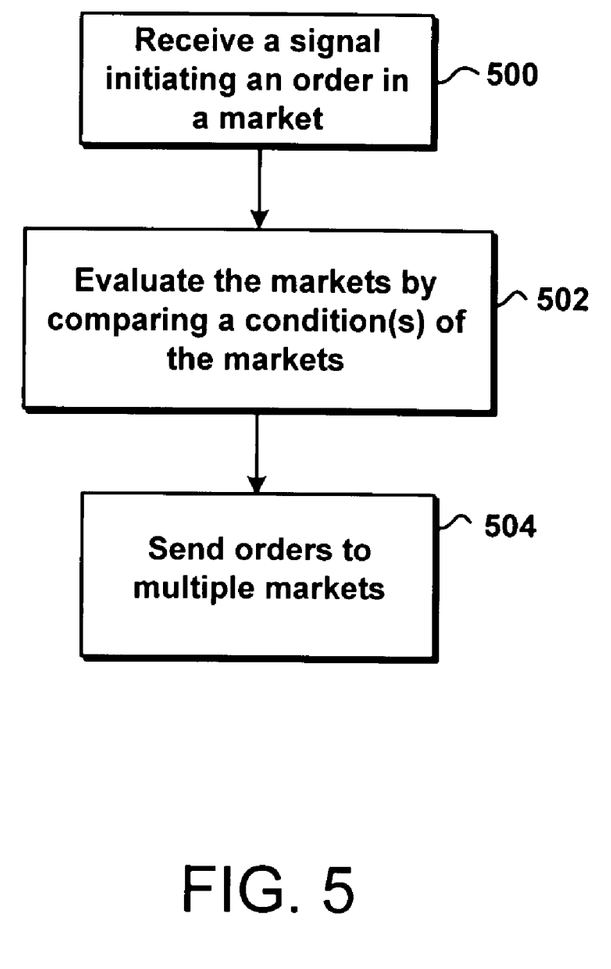
FIG. 5 is a flowchart illustrating another process for trading using the system of FIG. 2.

At step 406, based on the evaluation market comparator 200 preferably determines whether to direct the order from buying or selling in the synthetic market spread to buying or selling in the real market spread, or alternatively, to send orders to both markets (sending orders to multiple markets is illustrated with respect to FIG. 5). Market comparator 200 preferably looks to data that represents the synthetic market, which may have been generated by the autospreader, and it preferably looks to data that represents the real markets listed at external electronic exchanges. In the preferred embodiments, the first order may be directed (and sent over one or more networks) to the real market when it is most desirable for the trader to do so. Conditions may be programmed by the trader to be used in this determination. Here are some examples:

(1) The condition relates to the best price. Assume that the real market spread has a highest bid price that is lower than the highest bid price for the synthetic market spread. In this case, for example, it might be more desirable to send a buy order to the real market spread with a better hope of being filled faster or being filled at a better price. On the other hand, for example, assume that the real market spread has a lowest ask price that is higher than the lowest ask price for the synthetic market spread. In this case, for example, it might be more desirable to send a sell order to the real market spread with a better hope of being filled faster or being filled at a better price.

(2) The condition relates to the quantity available. Assume that the real market spread has much less quantity than the synthetic market spread. In this case, for example, it might be more desirable not to send an order to the real market spread as there is not enough quantity to fill the order.

It should also be understood that the preferred embodiments might take into account additional pieces of information to determine whether to send an order to a real market or even whether to change the order in the real market to a different price. For example, a trader might program the preferred embodiments to send orders in both markets (e.g., synthetic and real) to see which order is filled first. Once an order fills in one market, then the preferred embodiments may be programmed to attempt to delete the other unfilled order. In another example, if a trader is using the autospreader with the slop option "on," then the preferred embodiments may be programmed to automatically adjust a price of an order in the real market in a similar fashion. So, for example, if the trader has a synthetic order to buy at "100 +/−2" (slop in this example refers to +/−2 ticks) then, a buy order might be sent to the real market at "102" instead of "100." In another example, if a buy order already exists in the real market at "100," then the preferred embodiments may move the buy order in market from "100" to "102."

FIG. 5 shows another flowchart for illustrating alternative operation of the system shown in FIG. 2. At step 500, a signal is received to initiate an order in the synthetic market spread 306. At step 502, the real market spread is evaluated by market comparator 200. Accordingly, market comparator 200 sends an order with the same order parameters (e.g., price and quantity) to both markets including the synthetic market spread and the real market spread, per step 504. That way, there is a better chance of the order being filled. Under this scenario, the unfilled order in either market is deleted (or attempted to be deleted) when one of the orders is filled. Market comparator 200 may adjust the orders as they rest in the markets. For example, if there is an order for "10" in both markets and "5" is filled in the real market, then market comparator 200 may delete "5" of the "10" in the synthetic market.

Preferably, the trader can configure the market comparator 200 to send orders to the real and/or synthetic markets at different times, to send orders to the markets for different quantities and/or for different prices, or to send orders based to the markets where the order parameters are based on some formula, for example. In other words, it is preferable that the trader may configure the operation of the market comparator 200 to behave a particular way when opportunities are spotted. For example, the operation may be configured by typing options into a graphical user interface such as a visual (and audio, if so desired) computer environment running on the trading terminal that represents options with graphical images, such as icons, menus, and dialog boxes on the screen. Then, the trader can select and activate these options by pointing and clicking with a mouse, with the keyboard, or through some other input device. Alternatively, a spreadsheet may be used to implement formula-based strategies.

For example, with reference to FIG. 5, market comparator 200 may determine that there is an arbitrage opportunity between the markets 306 and 308. In particular, if the lowest ask price of the real market spread 308 is lower than the highest bid price for the synthetic market spread 306, then the market comparator may send an order to buy at the lowest ask price in the real market spread 308 and an opposite order to sell at the highest bid price of the synthetic market spread 306. Alternatively, if the highest bid price of the real market spread 308 is higher than the lowest ask price for the synthetic market spread 306, then market comparator 200 may send an order to buy at the lowest ask price in the synthetic market spread 306 and an opposite order to sell at the highest bid price of the real market spread 308.

Figure 6:
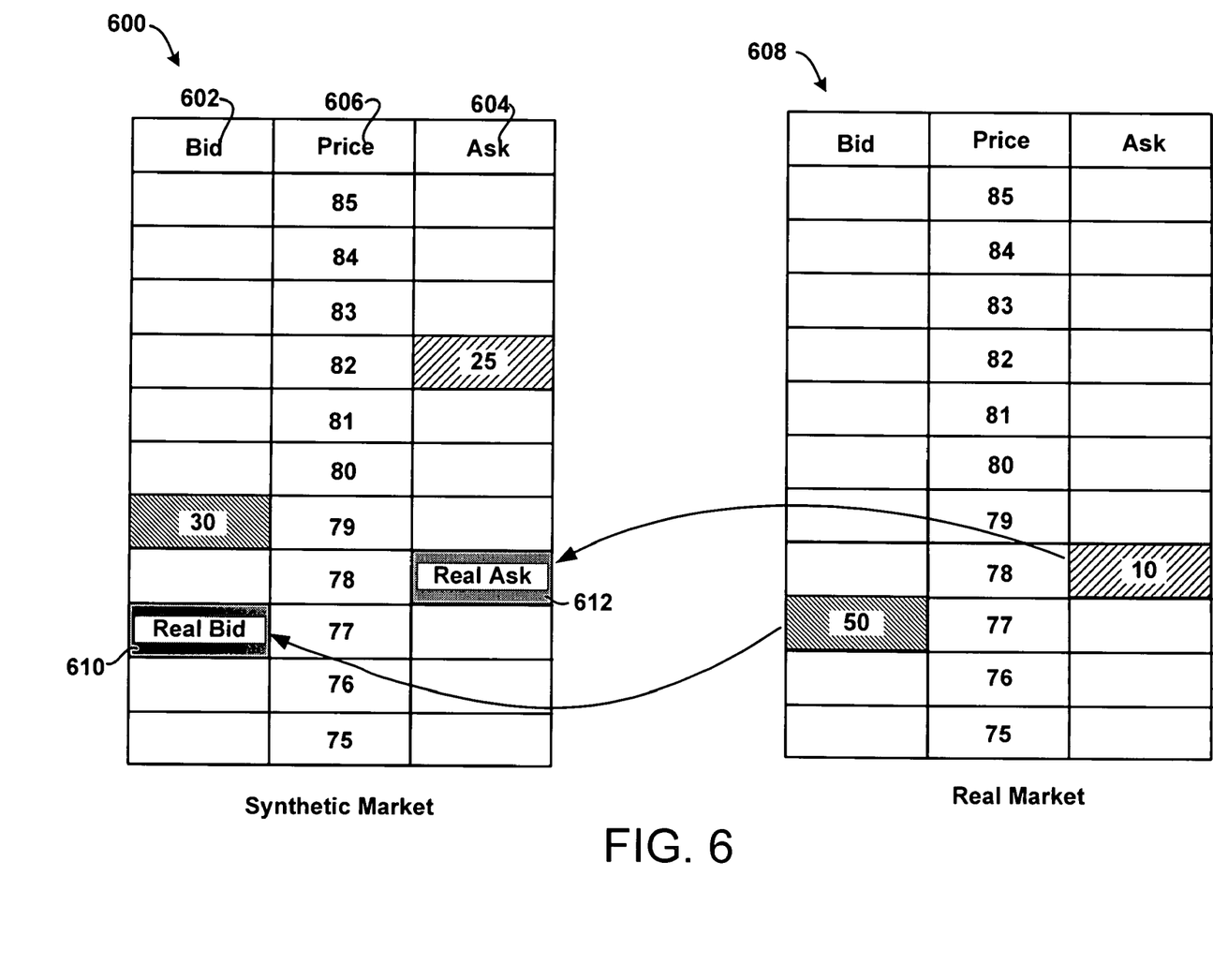
FIG. 6 illustrates example screen displays showing market information for a synthetic market and for a real market of a given tradeable object being traded.

FIG. 6 illustrates a screen display and order entry system in accordance with the preferred embodiments. In particular, the current inside market of the synthetic market spread is shown in one screen display that is generally indicated as 600. The display 600 is a preferred display as it simplifies the trading system by entering and tracking market information in an efficient manner, though the present invention is not limited to a display. This type of display arranges market information in an easy to read fashion by orienting the bid quantities and ask quantities along a common price axis that move relative to the common price axis. Bid quantities are shown in column 602 and ask quantities are shown in column 604. The representative prices for the given tradeable object are shown in price column 606, where the prices are arranged in numerical order in increments. In the example shown, the synthetic market spread has a highest bid price at "79" and a lowest ask price at "82." Other market information for the synthetic market spread may be shown, but has been left out for ease of illustration. The display allows a trader to enter orders directly into the display by selecting a price along the common axis, for example. Then, an order would be initiated with a preset quantity and the selected price.

Display screen 600 may be displayed to the trader at computer device 206 to show the synthetic market spread that is generated by the autospreader, for example. Sometimes, a trader prefers looking at the market information in which he/she is trading along with the legs of the spread. However, some traders try to limit the amount of screen space used by such displays.

A second display is also shown, which displays a real market spread generally indicated as 608. It is not necessary for the second display to be shown to the trader, but it is shown in the figure for purposes of explanation; showing the real market spread via display 608 might take up too much valuable screen space and therefore can be left off the screen. The second display is similar in format to the first display, except the market information corresponds to the real market and not the synthetic market. In the example shown, the real market has a highest bid price at "77" and a lowest ask price at "78."

According to the preferred embodiments, indicators 610, 612 may be displayed on the first display 600 to highlight the inside market of the real market spread. The trader may use these indicators 610, 612 to help in the decision making process. More specifically, indicator 610 highlights the highest bid price for the real market spread and indicator 612 highlights the lowest ask price for the real market spread.

With reference to screen display 600, it can be easily seen that an arbitrage opportunity exists. In other words, if programmed by the trader to act, market comparator 200 may automatically send a sell order at "79" in the synthetic market and send a buy order at "78" in the real market for some preset quantity (e.g., a quantity of "10" would be preferred in this example as the real market only has "10" available at "78"). By activating market comparator 200, a trader may easily identify such opportunities by simply looking to one display and market comparator 200 may be programmed to take immediate action into other markets.

In yet another embodiment, the available market information, including one or more levels of market depth, from the synthetic and real market spreads may be displayed in a single display window. That way, a trader may simply view one display, and the bid and ask quantities for each market spread would appear in the display along the same common price axis. It is envisioned that the trader could trade from the single display and orders would be routed to the appropriate spread market using techniques described herein. Then, multiple trading displays would not be necessary as all of the information is set forth in one display. Systems and methods that illustrate the integration of market information from various tradeable objects into a single screen are described in U.S. patent application Ser. No. 10/293,585, entitled "Method, Apparatus and Interface for Trading Multiple Tradeable Objects," filed on Nov. 12, 2002, the contents of which are incorporated by reference herein.

IV. Conclusion

The preferred embodiments assist the trader by evaluating other markets that are interchangeable with the presently traded one. Using the preferred embodiments, a trader can simply trade in one of the markets, while the preferred system performs the rest by ensuring the trader that his/her orders are going in to the best market for execution. The preferred embodiments work with all varieties of tradeable objects and markets. For example, the preferred embodiments may work similarly with only real markets, a combination of real and synthetic markets (such as the example with the autospreader illustrated above), or with only synthetic markets. An advantage of the preferred embodiments according to a particular use is that when a trader is trading a synthetically created market, the preferred embodiments may evaluate real markets to ensure that the trader is not missing any market opportunities, which may be unique to the real markets.

In addition, the preferred embodiments may highlight market information to the trader in a display without requiring displaying market information for all of the linked markets to the trader on a screen on generally limited space. Then, the trader can easily see and determine the movement in all linked markets and make trading decisions based on that information.

Another advantage is that the preferred embodiments may be programmed in any particular way to implement a trader's unique trading strategy. For example, orders may be sent only to buy/sell a synthetic tradeable object, orders may be sent to buy/sell both a synthetic tradeable object and an interchangeable real tradeable object, or orders may just be sent to the real tradeable object. In addition, order parameters such as price and quantity may be determined by the preferred system based on the trader's programmed instructions. For example, the orders sent to the various markets may be for the same price and quantity, for a different price based on a multiplier or some other formula such as based on slop, or for a different quantity based on a multiplier or some other formula. The point being that one skilled in the art will appreciate the programmable flexibility offered by the preferred embodiments.

It should be understood that the above description of the preferred embodiments, alternative embodiments, and specific examples are given by way of illustration and not limitation. For example, the features described herein could be incorporated into a variety of displays. Many changes and modifications within the scope of the present embodiments may be made without departing from the spirit thereof, and the present invention includes all such changes and modifications.

What is claimed is:

1. A computer-based method for use by a trader in an electronic trading system that includes at least one computer terminal connected over a network to at least one electronic exchange, the method comprising:
    initiating a first order associated with a spread at a desired spread price in a synthetic spread market, wherein the synthetic spread market is associated with a first real market and a second real market, and wherein the first and second real markets are offered by at least one electronic exchange; and
    in response to initiating the first order, automatically sending a second order to an exchange-provided spread market, wherein the synthetic spread market and the exchange-provided spread market offer interchangeable tradeable objects.

2. The method of claim 1 wherein the synthetic spread market is generated based on a relationship between the first and second real markets.

3. The method of claim 1 wherein the first order associated with the spread refers to a desire to buy or to sell the spread at the desired spread price such that computer software attempts to achieve a price based on the desired spread price by automatically sending and managing an order in the first real market, in the second real market, or in both the first and second real markets.

4. The method of claim 1 further comprising sending a third order to the first real market in response to initiating the first order, wherein the third order is based on market conditions in the second real market.

5. The method of claim 4 further comprising sending a fourth order to the second real market when the third order is filled, wherein the fourth order is at a price that attempts to achieve a price based on the desired price of the first order.

6. The method of claim 4 further comprising the step of attempting to delete the third order if the second order gets filled.

7. The method of claim 1 further comprising the step of sending and managing an order in the first real market in an effort to achieve a price based on a desired price of the first order, and automatically managing the second order in the exchange-provided spread market in an effort to achieve a price based on the desired price.

8. The method of claim 1 further comprising the step of evaluating a condition in the exchange-provided spread market.

9. The method of claim 8 wherein the condition is price or quantity.

10. The method of claim 8 further comprising the step of determining if a desired trading opportunity exists by comparing the condition in the exchange-provided spread market to a condition in the synthetic spread market.

11. The method of claim 1 further comprising:
    dynamically displaying a first indicator in relation with a first price level on a common price axis, wherein the first indicator is associated with a highest bid price in relation with the synthetic spread market;
    dynamically displaying a second indicator in relation with a second price level on the common price axis, wherein the second indicator is associated with a lowest ask price in relation with a synthetic spread market;
    dynamically displaying a third indicator in relation with a third price level on the common static price axis, wherein the third indicator is associated with a highest bid price available in the exchange-provided spread market; and
    dynamically displaying a fourth indicator in relation with a fourth price level on the common static price axis, wherein the fourth indicator associated with a lowest ask price available in the exchange-provided spread market.

12. The method of claim 11 wherein the first indicator, the second indicator, the third indicator and the fourth indicator are graphical indicators.

13. The method of claim 11, wherein the first indicator, the second indicator, the third indicator and the fourth indicator are numbers.

14. The method of claim 11 wherein the first indicator, the second indicator, the third indicator and the fourth indicator represent quantities.

15. A computer-based method for use by a trader in an electronic trading system that includes at least one computer terminal connected over a network to at least one electronic exchange, the method comprising:
    initiating a first order associated with a spread at a desired spread price for a synthetic tradeable object, wherein the synthetic tradeable object is associated with a first real tradeable object and a second real tradeable object, and wherein the first and second real tradeable objects are offered by at least one electronic exchange;
    in response to initiating the first order, automatically sending a second order for the first real tradeable object, wherein an order parameter of the second order is based on market conditions of the second real tradeable object;
    in response to initiating the first order, automatically sending a third order for an exchange-provided tradeable object, wherein the synthetic tradeable object and the exchange-provided tradeable object are interchangeable; and
    to achieve a price based on the desired spread price, automatically managing the second and third orders.

16. The method of claim 15 further comprising the step of sending a fourth order for the second real tradeable object when the second order is filled, wherein the fourth order is at a price based on the desired spread price of the first order, and automatically attempting to delete the third order.

17. The method of claim 15 further comprising the step of attempting to delete the third order when the second order is filled.

18. A computer-based method for use by a trader in an electronic trading system that includes at least one computer terminal connected over a network to at least one electronic exchange, the method comprising:
    receiving a signal indicating a desire to buy or sell a spread; evaluating a synthetic spread and an exchange provided spread, wherein the synthetic spread is associated with at least two underlying legs; and
    based on the evaluation, sending an order to one of the underlying legs of the synthetic spread, sending an order to the exchange provided spread, or sending an order to both the exchange provided spread and to one of the underlying legs of the synthetic spread.

19. A computer readable medium containing program instructions for causing a microprocessor to execute a method for use by a trader in an electronic trading system that includes at least one computer terminal connected over a network to at least one electronic exchange, comprising:

initiating a first order associated with a spread at a desired spread price in a synthetic spread market, wherein the synthetic spread market is associated with a first real market and a second real market, and wherein the first and second real markets are offered by at least one electronic exchange; and     in response to initiating the first order, automatically sending a second order to an exchange-provided spread market, wherein the synthetic spread market and the exchange-provided spread market offer interchangeable tradeable objects.

\* \* \* \* \*